United States Patent
Rat et al.

(10) Patent No.: US 12,152,943 B2
(45) Date of Patent: Nov. 26, 2024

(54) METHOD AND DEVICE FOR DETECTING WHEN A PREDEFINED TEMPERATURE THRESHOLD IS EXCEEDED

(71) Applicant: RENAULT s.a.s., Boulogne-Billancourt (FR)

(72) Inventors: Natalie Rat, Paris (FR); Abdeslam Ait El Bacha, Maisons-Alfort (FR); Alexandre Dochter, Montigny le bretonneux (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 616 days.

(21) Appl. No.: 16/967,928

(22) PCT Filed: Feb. 5, 2019

(86) PCT No.: PCT/EP2019/052808
§ 371 (c)(1),
(2) Date: Aug. 6, 2020

(87) PCT Pub. No.: WO2019/154818
PCT Pub. Date: Aug. 15, 2019

(65) Prior Publication Data
US 2021/0396595 A1 Dec. 23, 2021

(30) Foreign Application Priority Data

Feb. 7, 2018 (FR) .................................. 18 51033
Feb. 7, 2018 (FR) .................................. 18 51034

(51) Int. Cl.
*G01K 7/16* (2006.01)
*G01K 3/00* (2006.01)

(52) U.S. Cl.
CPC ............. *G01K 3/005* (2013.01); *G01K 7/16* (2013.01)

(58) Field of Classification Search
CPC . G01K 3/005; G01K 7/16; G01K 7/00; G01R 31/374; G01R 31/382; G01R 31/389
See application file for complete search history.

(56) References Cited

U.S. PATENT DOCUMENTS

| 5,038,676 A | * | 8/1991 | Davis | ................. G05D 23/1913 99/330 |
| 6,309,099 B1 | * | 10/2001 | Chang | .................... G06F 1/206 710/260 |

(Continued)

FOREIGN PATENT DOCUMENTS

| CA | 2514353 A1 * | 3/2006 | ................ B01L 7/52 |
| EP | 2065997 A   * | 11/2007 | |

(Continued)

OTHER PUBLICATIONS

16967928_2024-02-27_JP_2004335164_A_H.pdf, Nov. 25, 2004.*

(Continued)

*Primary Examiner* — Gail Kaplan Verbitsky
(74) *Attorney, Agent, or Firm* — Oblon, McClelland, Maier & Neustadt, L.L.P.

(57) ABSTRACT

A device and method for detecting when at least one heat source exceeds a temperature threshold. The device includes a component having an electrical resistance that varies according to the operating temperature of the component, and an electrical power source suitable for supplying an electrical current to the component. The component is configured to be thermally coupled to the heat source, such that the operating temperature varies according to the temperature of the heat source and the heat released in the component by the Joule effect, the variable electrical resistance having a high value if the operating temperature is greater than a triggering threshold, the electrical power source being configured to generate the electrical current such that the operating temperature is greater than or equal (Continued)

to the triggering threshold once the temperature of the heat source is greater than or equal to the temperature threshold.

15 Claims, 5 Drawing Sheets

(56) References Cited

U.S. PATENT DOCUMENTS

| | | | | |
|---|---|---|---|---|
| 7,800,510 B2 * | 9/2010 | Densham | ............ | H01M 10/486 |
| | | | | 340/636.15 |
| 8,237,409 B2 * | 8/2012 | Jang | .................... | H01M 50/574 |
| | | | | 429/7 |
| 8,756,025 B2 * | 6/2014 | Banerjee | ................ | G01K 13/00 |
| | | | | 702/182 |
| 11,302,504 B2 * | 4/2022 | Lee | .......................... | H02H 3/10 |
| 2011/0210703 A1 | 9/2011 | Souza et al. | | |
| 2011/0291621 A1 * | 12/2011 | Iles | .................... | H01M 10/443 |
| | | | | 320/152 |
| 2012/0153877 A1 * | 6/2012 | Baba | ....................... | H02J 7/342 |
| | | | | 320/134 |
| 2015/0164127 A1 * | 6/2015 | Long | .................. | A47J 36/2483 |
| | | | | 99/342 |

FOREIGN PATENT DOCUMENTS

| | | | | |
|---|---|---|---|---|
| EP | 3 270 454 A1 | | 1/2018 | |
| FR | 3022687 A1 * | | 12/2015 | ............ H05B 1/0236 |
| GB | 2518759 A * | | 4/2015 | .......... B60L 11/1816 |
| JP | H519870 A * | | 1/1993 | |
| JP | H08157433 A * | | 6/1996 | |
| JP | H08265919 A * | | 10/1996 | |
| JP | H0982785 A * | | 3/1997 | |
| JP | 2000259018 A * | | 9/2000 | |
| JP | 2001185338 A * | | 7/2001 | ............... H05B 6/04 |
| JP | 2004335164 A * | | 11/2004 | |
| WO | WO-2005116791 A1 * | | 12/2005 | ......... G05D 23/1932 |
| WO | WO-2015012193 A1 * | | 1/2015 | ........... H01H 37/761 |
| WO | WO 2015/101465 A1 | | 7/2015 | |

OTHER PUBLICATIONS

16967928_2024-07-16_WO_2005116791_A1_H.pdf,Nov. 25, 2004.*
2015-01-2916967928 WO_2015012193_A1_H.pdf,Jan. 29, 2015.*
16967928_2024-07-16_FR_3022687_A1_H.pdf,Dec. 25, 2015.*
International Search Report issued on Apr. 26, 2019 in PCT/EP2019/052808 filed on Feb. 5, 2019, 2 pages.
French Search Report issued on Oct. 12, 2018 in French Application No. 1851033 filed on Feb. 7, 2018.

* cited by examiner

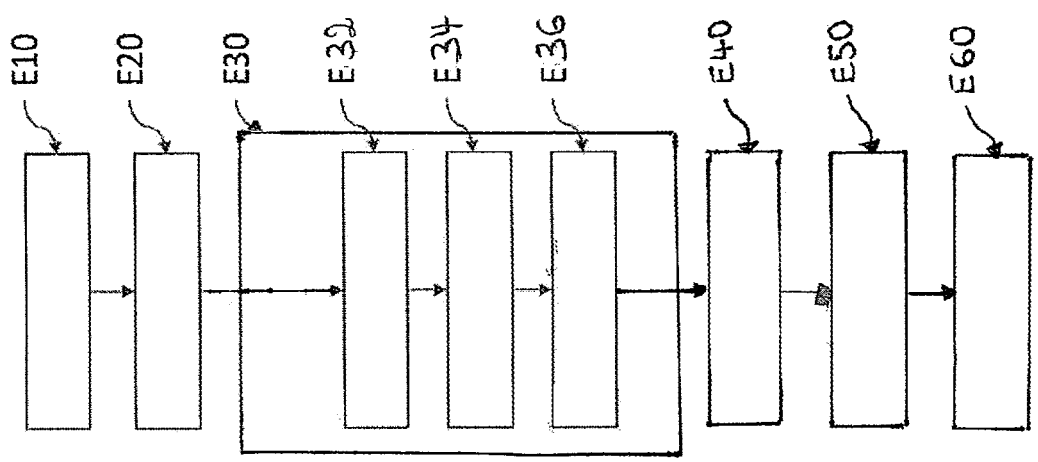

METHOD AND DEVICE FOR DETECTING WHEN A PREDEFINED TEMPERATURE THRESHOLD IS EXCEEDED

FIELD OF THE INVENTION

The invention relates to devices for monitoring the temperature of heat sources, and more particularly to monitoring devices comprising electronic components having a resistance that is variable with operating temperature.

CONTEXT OF THE INVENTION

The present invention proposes a device for detecting the exceedance in temperature of one or more heat sources, allowing adjustment of the monitored temperature threshold.

A device for monitoring the temperature of a plurality of heat sources, which consist of battery cells, is known from document CN102195270. The device comprises a plate having a volume that is variable with temperature. The plate is placed against a wall of the cell to be monitored. In case of over-heating, the plate expands and mechanically actuates a switch placed facing said plate, opening of the switch interrupting the passage of a charging current through the cell.

However, with this solution there is only one parameter for adjusting the over-heating temperature threshold, namely the distance between the plate and the switch; this parameter is therefore adjustable only during the manufacture of the module comprising the one or more cells to be monitored, and afterwards is unchangeable. Post-manufacture, it is no longer possible to adjust the value of the monitored temperature threshold. In addition, abrupt disconnection of the cells results, and hence no other corrective measures may be envisioned.

Therefore, there is a need for a device for monitoring the temperature of one or more heat sources that allows the monitored temperature threshold to be adjusted.

With this aim, the invention aims to provide a device for detecting exceedance of a first predefined threshold of a temperature by at least one heat source, the detecting device comprising:
  at least one component having an electrical resistance that is variable depending on an operating temperature of the component,
  an electrical power source able to deliver an electrical current that flows through said component said component being able to be thermally coupled to said heat source, so that the operating temperature varies depending on
    the temperature of the heat source and
    the heat given off by Joule heating in the component when the electrical current flows therethrough,
  the variable electrical resistance having a high value if the operating temperature is above a second predefined temperature threshold, called the trip threshold, the electrical power source being configured to generate the electrical current so that the operating temperature is higher than or equal to the trip threshold if the temperature of said heat source is higher than or equal to the first predefined temperature threshold, the variable electrical resistance then having the high value,
    wherein the electrical power source is a current source, and wherein the electrical current is delivered in the form of periodic pulses, of fixed or variable duty cycle.

In preferred embodiments the device according to the invention may advantageously have the following features, alone or in combination:
  the device may be electrically isolated from the heat source,
  it may be configured to detect the exceedance of the first temperature threshold by one heat source among a plurality of heat sources, and may comprise a plurality of components taking the form of a plurality of resettable fuses, each resettable fuse being thermally coupled to at least one heat source, the fuses being connected in series,
  it may furthermore comprise a plurality of resistors, each able to have a different resistance, one resistor being able to be connected in parallel across the terminals of each fuse,
  the at least one heat source may be a battery cell,
  the device may furthermore comprise a monitoring module configured to trigger a correcting or flagging action when the variable electrical resistance of one of said components has the high value.

Another subject of the invention is a method for monitoring exceedance of a first threshold of a temperature by at least one heat source, the method being executed by a detecting device (D) comprising:
  at least one component having an electrical resistance that is variable depending on an operating temperature of the component, the variable electrical resistance having a high value if the operating temperature is above a second predefined temperature threshold, called the trip threshold an electrical power source able to deliver an electrical current that flows through said component, the method comprising:
  a step of thermally coupling the at least one heat source to the at least one component, so that the operating temperature varies depending on
    the temperature of the heat source and,
    the heat given off by Joule heating in the component when the electrical current flows therethrough,
  a step of connecting the electrical power source to the at least one component;
  a step of configuring the electrical current so that the operating temperature is higher than or equal to the trip threshold if the temperature of said heat source is higher than or equal to the first predefined temperature threshold, the variable electrical resistance then having the high value,
wherein the electrical power source is a current source, and wherein the electrical current is delivered in the form of periodic pulses, of fixed or variable duty cycle.

In preferred embodiments, the method according to the invention may advantageously have the following features, alone or in combination, provided that the detecting device is able to comprise:
  a plurality of components connected in series and each having an electrical resistance that is variable depending on the respective operating temperature and,
  a plurality of resistors that have different resistances, one resistor being connected in parallel across the terminals of each component, so that, when the electrical resistance of a component has the high value, the equivalent resistance of the electrical chain formed by the components and the resistors has a different value for each component and the resistor that is connected thereto in parallel, the method may then comprise:
    during the thermal coupling step, each component is thermally coupled to at least one heat source,
    during the connecting step, the electrical power source is connected to the electrical chain formed by the components and the resistors,
the method may then furthermore comprise:
    a step of generating a supply signal with the electrical power source,
    a step of detecting a response signal across the terminals of the electrical power source,
    a step of determining an equivalent resistance of the electrical chain formed by the components and the resistors;
    a step of identifying the component the resistance of which has the high value, depending on the equivalent resistance.

The configuring step may then comprise a sub-step of dimensioning the detecting device comprising determining a first duty cycle of the periodic current pulses, depending on:
    the first temperature threshold to be monitored,
    the electrical characteristics of the at least one component, and
    the characteristics of the thermal coupling between the at least one heat source and the at least one component.

After a first detection of exceedance of the first temperature threshold, the configuring step may furthermore comprise:
    a sub-step of transmitting current pulses having a second duty cycle lower than the first duty cycle;
    a sub-step of confirming detection of the first exceedance detection.

Another subject of the invention relates to a vehicle comprising a device for detecting temperature exceedance such as described above.

BRIEF DESCRIPTION OF THE DRAWINGS

FIG. 5 shows the steps of the method for identifying a heat source having exceeded a predefined temperature threshold, according to one embodiment of the invention.

DETAILED DESCRIPTION OF THE INVENTION

Figure 1:
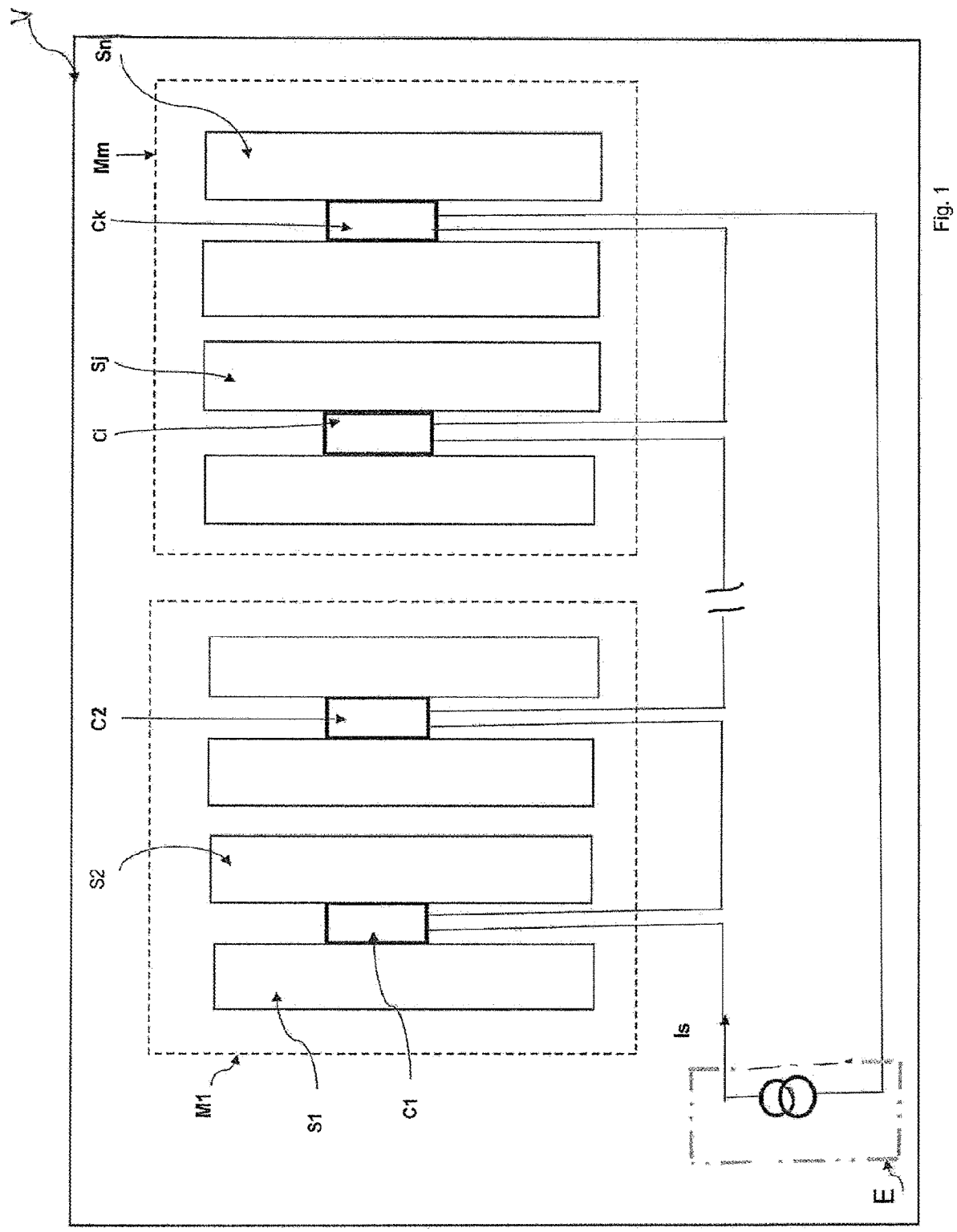
FIGS. 1 and 2 schematically show two embodiments of a device for detecting temperature exceedance that is arranged to monitor the respective temperatures of a plurality of battery cells.

FIG. 1 schematically shows a detecting device according to one embodiment of the invention. The device D is installed in a vehicle V, in order to monitor the temperature of a plurality of heat sources S1, S2, Sj, . . . Sn consisting of battery cells that are grouped into modules M1, . . . Mm. The battery cells are soft-shell cells.

The device comprises a plurality of components C1, C2, Ci, Ck having an electrical resistance RPTC that is variable depending on an operating temperature Tf of the component C1, C2, Ci, Ck. In one preferred embodiment, the components C1, C2, Ci, Ck take the form of a plurality of resettable fuses.

Each resettable fuse C1, C2, Ci, Ck is thermally coupled to at least one heat source S1, S2, Sj, Sn. In the example illustrated in FIG. 1, the heat sources are battery cells, and the thermal coupling is achieved by coating each resettable fuse C1, C2, Ci, Ck with a thermal coating, which is then fastened in contact with the battery cells. Each resettable fuse C1, C2, Ci, Ck is coupled to two battery cells, the coating being fastened by adhesive bonding and/or compression.

The device also comprises an electrical power source E that is able to deliver an electrical current Is that flows through the resettable fuses C1, C2, Ci, Ck, which are thermally coupled to the battery cells S1, S2, Sj, Sn, and hence the respective operating temperatures of the components C1, C2, Ci, Ck varies depending on
    the temperature T of the one or more heat sources S to which they are thermally coupled, and
    the heat generated by Joule heating in the component C1, C2, Ci, Ck when the electrical current Is flows therethrough.

The variable electrical resistance of a component, in this example a resettable fuse, has a high value Rd if the operating temperature Tf of the component is above a second predefined temperature threshold, called the trip threshold Td.

The electrical power source is configured to generate the electrical current Is so that the operating temperature Tf is higher than or equal to the trip threshold Td if the temperature T of said heat source S is higher than or equal to the first predefined temperature threshold TS, the variable electrical resistance then having the high value Rd.

The device D is electrically isolated from the heat source S. In this way, the operating characteristics of the detecting device D are independent of the electrical characteristics of the heat sources to be monitored: the current Is flowing through the resettable fuses has a value that varies between 100 mA and 800 mA, for a voltage delivered by the power source E of a typical value of 12 V, whereas the operating voltage delivered by all of the battery cells considered together is typically 400 V.

In the illustrated example, the power source E is a current source and the components C1, C2, Ci, Ck are connected in series. In this way, the electrical current Is does not depend on the number k of components of the device D, nor on the number n of heat sources to be monitored, this simplifying the adjustment of the first temperature threshold TS. Simply by decreasing the current Is delivered by the current source E, the first temperature threshold TS is increased, and vice versa.

As already mentioned, the operating temperature of a component, in this example a resettable fuse, depends on the temperature T of the heat source S to which the component is thermally coupled, and on the heat generated by Joule heating in the component when the electrical current Is flows therethrough. Thus, for a component characterized by a given trip temperature threshold Td, the first temperature threshold TS of the monitored heat sources S1, S2, Sj, Sn may be adjusted by varying the amount of heat generated by Joule heating in the component.

In one preferred embodiment, the electrical current Is is delivered in the form of periodic pulses, of fixed or variable duty cycle.

The amount of heat generated by Joule heating in the component may thus be adjusted by modifying the time for which electrical current passes through the component, this possibly being achieved simply by varying the duty cycle of the periodic pulses.

Figure 3:
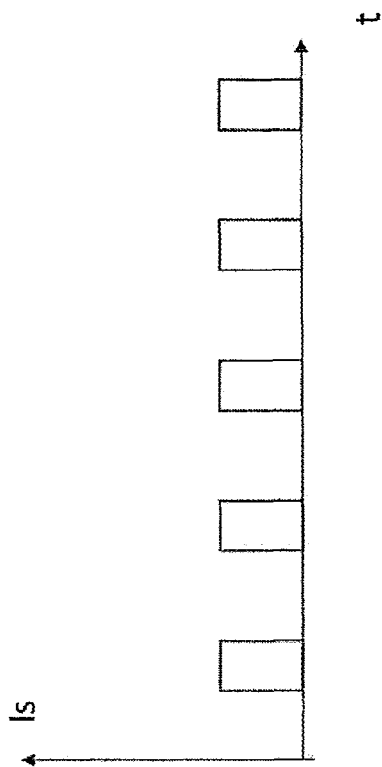
FIGS. 3 and 4 show two devices for detecting temperature exceedance according to two embodiments of the invention.
Figure 3:
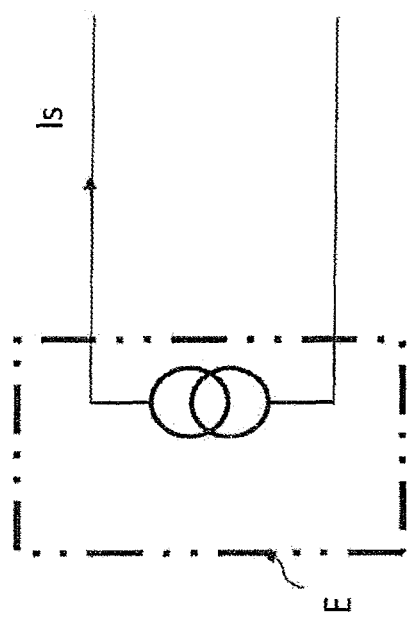

FIG. 3 illustrates one embodiment of the detecting device, incorporating an electrical power source E configured to deliver an electrical current Is in the form of electrical pulses.

In a phase E32 of dimensioning the detecting device D, a fixed duty cycle may be defined for each application, depending on the first temperature threshold TS to be monitored, on the electrical characteristics of the components C1, C2, Ci, Ck, and on the characteristics of the thermal coupling between the heat sources to be monitored and these components. This duty cycle, and therefore the first temperature threshold TS to be monitored, may thus be adjusted depending on specificities of each application.

In a phase of exploitation of the detecting device D, the ability to vary the duty cycle allows the first temperature threshold TS to be varied without needing to make changes to the way in which the device D is installed or the way in which it is thermally coupled to the heat sources.

A one-off variation in the duty cycle, after a first detection of exceedance of the first temperature threshold TS, allows, in a phase E36, this first detection to be confirmed, and therefore allows the reliability of the result of the detection to be increased by transmitting pulses of lower duty cycle in a phase E34.

In one preferred embodiment, the detecting device D furthermore comprises a monitoring module M configured to trigger a correcting or flagging action when the variable electrical resistance of one of said components C1, C2, Ci, Cn has the high value Rd. This module M is configured to detect the change in value of the resistance of a component Ci, for example by measuring the voltage across and/or the current at the terminals of the electrical power source Next the monitoring module M may trigger a cooling action, which will cause a decrease in the temperature of the heat sources and of the components C1, C2, Ci, Cn. This configuration is particularly advantageous in the case of detecting devices D equipped with components C1, C2, Ci, Cn taking the form of resettable fuses. Specifically, the variable resistance of this type of component returns to a low value, called the hold resistance Rm, once the operating temperature has dropped, this allowing the process of monitoring the temperature of the heat sources to begin again.

Figure 2:
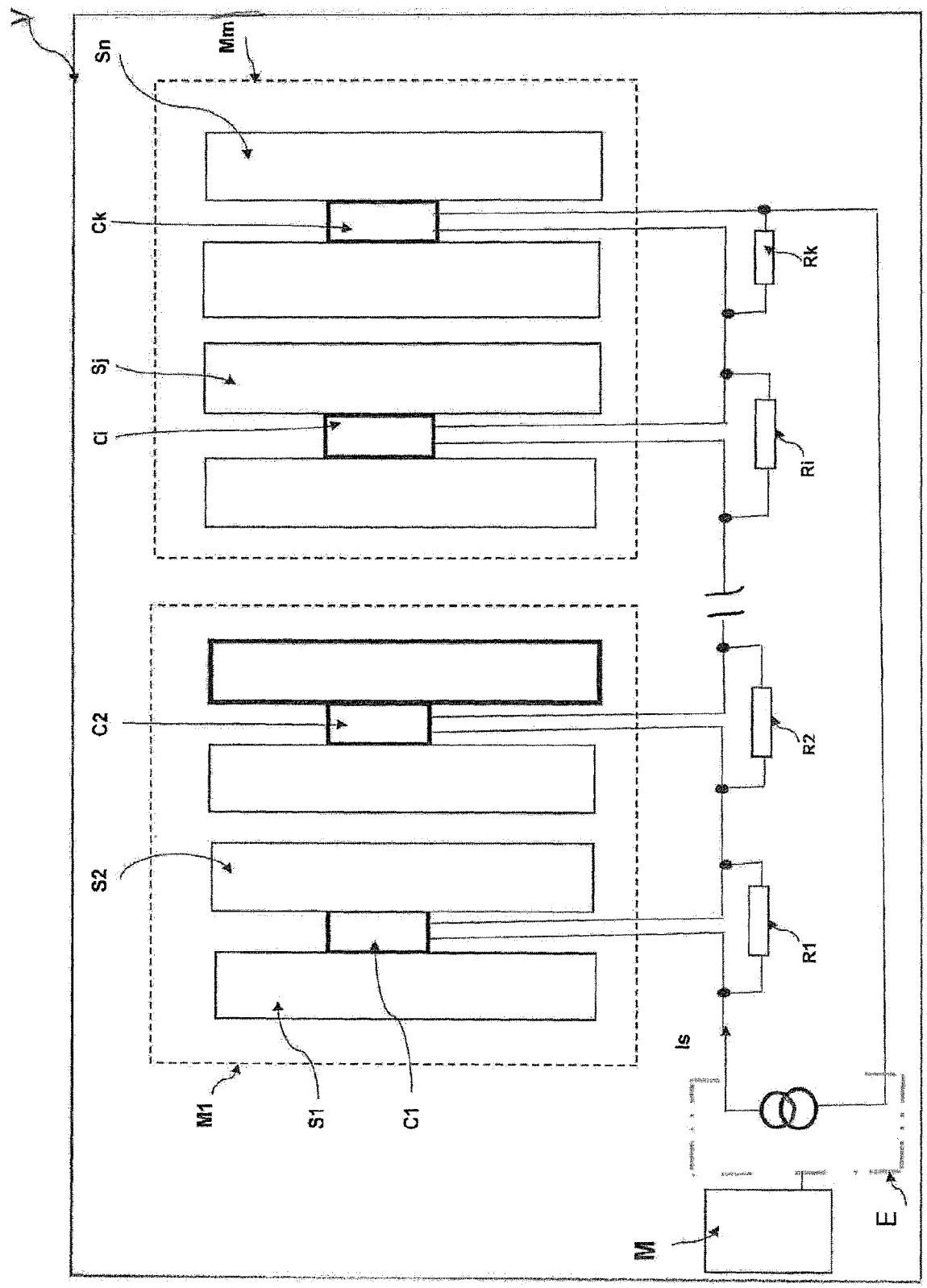

In one preferred embodiment, as illustrated in FIG. 2, the device D furthermore comprises a plurality of resistors R1, R2, Ri, Rk each having a different resistance, one resistor being connected in parallel across the terminals of each component C1, C2, Ci, Ck.

This arrangement allows a resettable fuse Ci (which is thermally coupled to one heat source Sj, in this example a battery cell) that has exceeded the first temperature threshold TS to be identified, as will be explained below. Thus, cooling strategies that target specific heat sources may be implemented.

Such a detecting device D may be configured to identify, among a plurality of heat sources S1, S2, Sj, Sn, a heat source Sj having exceeded a first predefined temperature threshold TS. The device D comprises a plurality of components C1, C2, Ci, Ck that are connected in series, and that each have an electrical resistance that is variable depending on a respective operating temperature, the variable electrical resistance having a high value Rd, called the trip resistance, if the operating temperature Tfj is above the second predefined temperature threshold, called the trip threshold Td, and a low value Rm, called the hold resistance, in the contrary case.

It will be noted that, depending on the embodiment, the hold resistance Rm of a component C1, C2, Ci, Ck may correspond to a value close to 0Ω, and the trip resistance Rd to an open circuit; this is the case for components such as fuses or on/off switches.

In the embodiment using resettable fuses, the hold resistance Rm is typically a resistance of 0Ω, and the trip resistance Rd is typically a resistance of a few kΩ.

In any case, the value of the hold resistance Rm is negligible with respect to the value of the trip resistance Rd, such that $Rd+(k-1)*Rm \approx Rd$, k being the number of components of the detecting device D. The use of this feature will be explained below.

Each component C1, C2, Ci, Ck is able to be thermally coupled to at least one of the heat sources S1, S2, Sj, Sn, so that its operating temperature is higher than or equal to the trip threshold Td if the temperature of said at least one heat source Si, Sk, Sn is higher than or equal to the first predefined temperature threshold TS, the variable electrical resistance then having the high value Rd.

The device D furthermore comprises a plurality of resistors R1, R2, Ri, Rk that have different resistances, one resistor being connected in parallel across the terminals of each component C1, C2, Ci, Ck so that, when the electrical resistance of a component Ci has the high value Rd, the equivalent resistance Re of the electrical chain formed by the components C1, C2, Ci, Ck and the resistors R1, R2, Ri, Rk has a value that is characteristic of this component (Ck) and the resistor Ri that is connected thereto in parallel.

Figure 4:
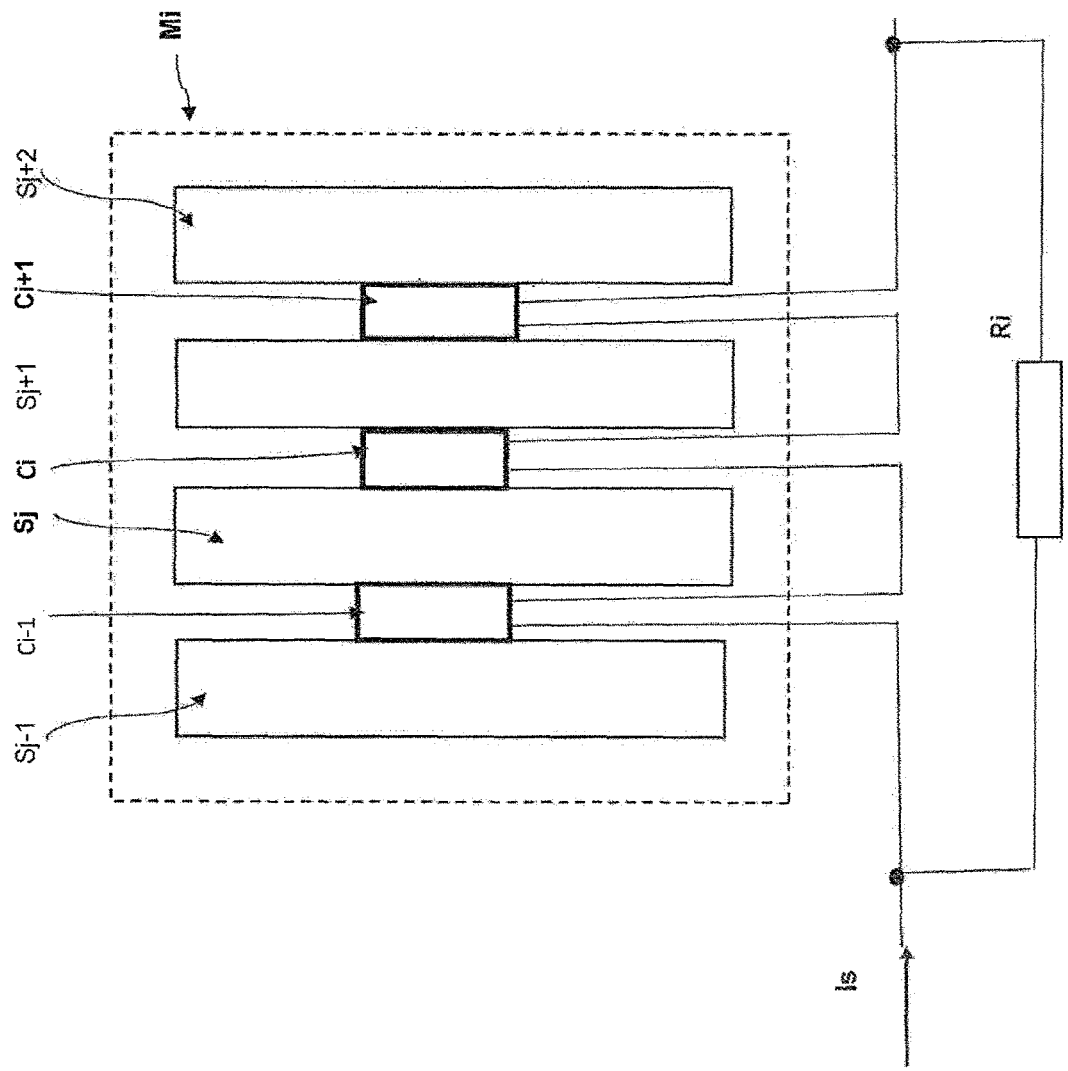

Alternatively, a resistor Ri may be connected in parallel to a group of components Ci−1, Ci, Ci+1 that are connected in series and each coupled to at least one respective heat source. This arrangement is particularly advantageous if the heat sources are grouped. An example of application of this embodiment of the invention is monitoring of the temperature of soft-shell battery cells grouped into battery modules M1, M2, . . . Mm, as illustrated in FIG. 4. If one of the monitored battery cells Sj exceeds the first predefined temperature threshold TS, the component Ci thermally coupled to this cell Sj will have the high resistance Rd. If the other cells of the battery do not exceed the first temperature threshold TS, the set of components connected in series will have an equivalent resistance of $Rd+(k-1)*Rm$, k being the number of components connected in series; these resistances connected in parallel to the resistor Ri will together have an equivalent resistance $$Re=Ri[Rd+(k-1)*Rm]/[Ri+Rd+(k-1)*Rm].$$

The components Ci and the resistor Ri are chosen such that
1) the value of the resistance Rm is negligible with respect to that of Rd, i.e. such that:

$$Rd+(k-1)*Rm \approx Rd.$$

Therefore, as:

$$Re=Ri*[Rd+(k-1)*Rm]/[Ri+Rd+(k-1)*Rm],$$

its value is substantially equal to:

$$Re \approx Ri*Rd/(Ri+Rd).$$

2) Ri is negligible with respect to Rd, and hence:

$$Ri*Rd/(Ri+Rd) \approx Ri.$$

Therefore, the equivalent resistance Re of a resistor Ri connected in parallel to a component Ci thermally coupled to a battery cell Sj that has exceeded the first temperature threshold TS, or to a group of components Ci−1, Ci, Ci+1 that are connected in series and one component Ci of which is thermally coupled to a battery cell Sj that has exceeded the first temperature threshold TS, is substantially equal to Ri.

By judiciously choosing different resistances for the resistors R1, R2, . . . Ri, Rk the equivalent resistance of the electrical chain in question may be made to exhibit a characteristic value
  of the component Ci thermally coupled to the battery cell Sj that has exceeded the first temperature threshold TS, or
  of the group of components Ci−1, Ci, Ci+1 that are connected in series and one component Ci thermally coupled to one battery cell Sk of which has exceeded the first temperature threshold TS
  and of the resistor Ri that is connected thereto in parallel.

A method for identifying a heat source Sj that has exceeded a first predefined threshold TS of a temperature T, among a plurality of heat sources S1, S2, Sj, Sn, will now be described with reference to FIG. 5.

The method may be implemented using a detecting device such as described above, i.e. one comprising a plurality of components C1, C2, Ci, Ck able to have, depending on their operating temperature, a low value, called the hold resistance Rm, or a high value, called the trip resistance Rd, and a plurality of resistors R1, R2, Ri, Rk that have different resistances and that are connected in parallel to a component Ci or to a group of components Ci−1, Ci, Ci+1 that are connected in series.

The method comprises
  a step E10 of thermally coupling the plurality of heat sources S1, S2, Sj, Sn to components C1, C2, Ci, Ck, each component being thermally coupled to at least one heat source Si, so that its operating temperature is higher than or equal to the trip threshold Td if the temperature of said at least one heat source is higher than or equal to the first predefined temperature threshold TS, the variable electrical resistance of the component then having the high value Rd,
  a step E20 of connecting the electrical chain formed by the components C1, C2, Ci, Ck and the resistors R1, R2, Ri, Rk to an electrical power source E,
  a step E30 of generating a supply signal U, I with the electrical power source E,
  a step E40 of detecting a response signal i, u across the terminals of the electrical power source E,
  a step E50 of determining an equivalent resistance Re of the electrical chain formed by the components C1, C2, Ci, Ck and the resistors R1, R2, Ri, Rk,
  a step E60 of identifying the component Ci the resistance of which has the high value Rd, depending on the equivalent resistance Re.

In the illustrated example, the supply signal generated in the generating step E30 is an electrical current Is, and the response signal detected in the detecting step E40 is a voltage across the terminals of the current source E.

Since the value of the generated current Is and the value of the detected voltage are known, the equivalent resistance Re of the electrical chain is determined during the execution of the determining step E50. As explained above, this equivalent resistance is characteristic of the component Ci that has, or of the group of components one of which has, a high resistance value Rd, and of the resistor Ri that is connected thereto in parallel. This allows this component Ci to be identified in the identifying step E60.

Of course, the present invention is not limited to the examples and embodiments described and shown. On the contrary, there are many variants of the invention that will be within the ability of those skilled in the art to produce.

For example, other arrangements are possible, depending on the configuration of the heat sources. In particular, the invention may be applied to monitoring areas of heat sources if a grid is formed covering the area to be monitored and components such as described, thermally coupled to the area to be monitored, are placed at the nodes of the grid.

The invention claimed is:

1. A device for detecting exceedance of a first predefined temperature threshold by at least one heat source, the device comprising:
  at least one component having an electrical resistance that is variable depending on an operating temperature of the component; and
  an electrical power source to deliver an electrical current that flows through said component,
  said component being configured to be thermally coupled to said heat source, so that the operating temperature varies depending on
    temperature of the heat source, and
    heat given off by Joule heating in the component when the electrical current flows therethrough,
  the variable electrical resistance having a high value if the operating temperature is above a second predefined temperature threshold, called a trip threshold, and
  the electrical power source being configured to generate the electrical current so that the operating temperature is higher than or equal to the trip threshold if the temperature of said heat source is higher than or equal to the first predefined temperature threshold, the variable electrical resistance then having the high value, wherein
  the first predefined temperature threshold is adjusted based on an amount of the heat given by the Joule heating in the component,
  the electrical power source is a current source,
  the electrical current is delivered in a form of periodic pulses, of fixed or variable duty cycle, and
  the electrical power source is configured to dimension the device by determining a first duty cycle of period current pulses, depending on the first predefined temperature threshold to be monitored.

2. The device as claimed in claim 1, wherein the device is electrically isolated from the heat source.

3. The device as claimed in claim 1, wherein the device is configured to detect exceedance of the first predefined temperature threshold by one heat source among a plurality of heat sources, and comprises a plurality of components taking a form of a plurality of resettable fuses, each resettable fuse being thermally coupled to at least one heat source, the fuses being connected in series.

4. The device as claimed in claim 1, further comprising a plurality of resistors, each having a different resistance, one resistor being connected in parallel across terminals of each fuse.

5. The device as claimed in claim 1, wherein the at least one heat source is a battery cell.

6. The device as claimed in claim 1, further comprising a monitoring module configured to trigger a correcting or flagging action when the variable electrical resistance of one of said components has the high value.

7. A monitoring method for monitoring exceedance of a first predefined temperature threshold by at least one heat source, the method being executed by a detecting device comprising
  at least one component having an electrical resistance that is variable depending on an operating temperature of the component, the variable electrical resistance having a high value if the operating temperature is above a second predefined temperature threshold, called a trip threshold, and an electrical power source to deliver an electrical current that flows through said component, the monitoring method comprising:

thermally coupling the at least one heat source to the at least one component, so that the operating temperature varies depending on temperature of the heat source and heat given off by Joule heating in the component when the electrical current flows therethrough, connecting the electrical power source to the at least one component; and configuring the electrical power source to generate the electrical current so that the operating temperature is higher than or equal to the trip threshold if the temperature of said heat source is higher than or equal to the first predefined temperature threshold, the variable electrical resistance then having the high value, wherein the first predefined temperature threshold is adjusted based on an amount of the heat given by the Joule heating in the component, the electrical power source is a current source, the electrical current is delivered in a form of periodic pulses, of fixed or variable duty cycle, and the configuring comprises dimensioning the detecting device comprising determining a first duty cycle of period current pulses, depending on the first predefined temperature threshold to be monitored.

8. The monitoring method as claimed in claim 7, wherein the detecting device comprises a plurality of components connected in series and each having an electrical resistance that is variable depending on the respective operating temperature, and a plurality of resistors that have different resistances, one resistor being connected in parallel across terminals of each component, so that, when the electrical resistance of a component has the high value, an equivalent resistance of the electrical chain formed by the components and the resistors has a different value for each component and the resistor that is connected thereto in parallel, and wherein during the thermal coupling, each component is thermally coupled to at least one heat source, during the connecting, the electrical power source is connected to the electrical chain formed by the components and the resistors, the monitoring method further comprising:

generating a supply signal with the electrical power source;

detecting a response signal across terminals of the electrical power source;

determining the equivalent resistance of the electrical chain formed by the components and the resistors; and identifying the component the resistance of which has the high value, depending on the equivalent resistance.

9. The monitoring method as claimed in claim 7, wherein the configuring comprises the dimensioning of the detecting device, which comprises the determining of the first duty cycle of the period current pulses, depending further on:

electrical characteristics of the at least one component, and characteristics of the thermal coupling between the at least one heat source and the at least one component.

10. The monitoring method as claimed in claim 9, wherein, after a first detection of exceedance of the first predefined temperature threshold, the configuring further comprises:

transmitting current pulses having a second duty cycle lower than the first duty cycle; and confirming detection of the first exceedance detection.

11. A vehicle comprising the device for detecting exceedance of the first predefined temperature threshold as claimed in claim 1.

12. The device as claimed in claim 1, wherein the first predefined temperature threshold is adjusted to be increased.

13. The device as claimed in claim 1, wherein the first predefined temperature threshold is adjusted to be decreased.

14. The monitoring method as claimed in claim 7, wherein the configuring comprises the dimensioning of the detecting device, which comprises the determining of the first duty cycle of the period current pulses, depending further on electrical characteristics of the at least one component.

15. The monitoring method as claimed in claim 7, wherein the configuring comprises the dimensioning of the detecting device, which comprises the determining of the first duty cycle of the period current pulses, depending further on characteristics of the thermal coupling between the at least one heat source and the at least one component.

* * * * *